(12) United States Patent
Liu

(10) Patent No.: US 12,003,041 B2
(45) Date of Patent: Jun. 4, 2024

(54) MOBILE TERMINAL AND ANTENNA CONTROL METHOD

(71) Applicant: VIVO MOBILE COMMUNICATION CO., LTD., Guangdong (CN)

(72) Inventor: Yang Liu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 542 days.

(21) Appl. No.: 17/356,090

(22) Filed: Jun. 23, 2021

(65) Prior Publication Data

US 2021/0320410 A1    Oct. 14, 2021

Related U.S. Application Data

(63) Continuation of application No. PCT/CN2019/123598, filed on Dec. 6, 2019.

(30) Foreign Application Priority Data

Dec. 25, 2018    (CN) .......................... 201811595496.6

(51) Int. Cl.
*H01Q 5/35* (2015.01)
*H01Q 9/04* (2006.01)
*H04M 1/02* (2006.01)

(52) U.S. Cl.
CPC ............. *H01Q 5/35* (2015.01); *H01Q 9/0421* (2013.01); *H04M 1/0218* (2013.01)

(58) Field of Classification Search
CPC .... G06F 1/1616; G06F 1/1677; G06F 1/1698; H01Q 1/243; H01Q 3/247; H01Q 5/307;
(Continued)

(56) References Cited

U.S. PATENT DOCUMENTS 8,355,761 B2 *  1/2013  Harada ................... H01Q 9/36
                                                        455/90.3
2010/0248800 A1 *  9/2010  Hiraoka ................. H01Q 21/28
                                                        455/575.7
(Continued)

FOREIGN PATENT DOCUMENTS

CN    102394348 A    3/2012
CN    102473999 A    5/2012
(Continued)

OTHER PUBLICATIONS

Supplementary European Search Report regarding Patent Application No. 19903852.2-1203/3905001; PCT/CN2019/123598, dated Jan. 26, 2022.
(Continued)

*Primary Examiner* — Nguyen T Vo
(74) *Attorney, Agent, or Firm* — Harness, Dickey & Pierce, P.L.C.

(57) ABSTRACT

A mobile terminal includes a first module and a second module. The first module and the second module are in a folded state or an extended state. The first module is provided with a first antenna radiation branch, the first antenna radiation branch is provided with a first feed point and a first ground point, and the first feed point is electrically connected to a first feed source via a switch. The second module is provided with a second antenna radiation branch, and the second antenna radiation branch is provided with a second feed point and a second ground point. In the case where the first module and the second module are in the folded state, the switch is in the off state, and in the case where the first module and the second module are in the extended state, the switch is in the on state.

11 Claims, 6 Drawing Sheets

(58) Field of Classification Search
CPC ...... H01Q 5/35; H01Q 9/0421; H04B 1/3838; H04B 1/401; H04M 1/0214; H04M 1/0218; H04M 1/0245
See application file for complete search history.

(56) References Cited

U.S. PATENT DOCUMENTS

| | | | |
|---|---|---|---|
| 2011/0273358 A1* | 11/2011 | Koyama | H01Q 1/24 343/876 |
| 2012/0001822 A1* | 1/2012 | Liu | H01Q 1/243 343/852 |
| 2012/0112972 A1* | 5/2012 | Ogawa | H01Q 1/243 343/702 |
| 2014/0240178 A1 | 8/2014 | Chun et al. | |
| 2014/0323063 A1 | 10/2014 | Xu et al. | |
| 2017/0272557 A1 | 9/2017 | Xue et al. | |

FOREIGN PATENT DOCUMENTS

| | | |
|---|---|---|
| CN | 204966695 U | 1/2016 |
| CN | 106450752 A | 2/2017 |
| CN | 106878497 A | 6/2017 |
| CN | 107331964 A | 11/2017 |
| CN | 107994956 A | 5/2018 |
| CN | 108347759 A | 7/2018 |
| CN | 108712536 A | 10/2018 |
| CN | 108879072 A | 11/2018 |
| CN | 109725680 A | 5/2019 |

OTHER PUBLICATIONS

International Search Report and Written Opinion of the International Searching Authority regarding International Patent Application No. PCT/CN2019/123598, dated Mar. 2, 2020. Translation provided by Bohui Intellectual Property.

First Office Action regarding Chinese Patent Application No. 201811595496.6, dated Apr. 2, 2020. Translation provided by Bohui Intellectual Property.

Second Office Action regarding Chinese Patent Application No. 201811595496.6, dated Mar. 23, 2021. Translation provided by Bohui Intellectual Property.

* cited by examiner

MOBILE TERMINAL AND ANTENNA CONTROL METHOD

CROSS-REFERENCE TO RELATED APPLICATIONS

This application is a Bypass Continuation Application of PCT/CN2019/123598 filed on Dec. 6, 2019, which claims priority to Chinese Patent Application No. 201811595496.6 filed on Dec. 25, 2018, which are incorporated herein by reference in their entirety.

TECHNICAL FIELD

The present disclosure relates to the field of communications technologies, and in particular, to a mobile terminal and an antenna control method.

BACKGROUND

In recent years, foldable-screen mobile terminals (for example, foldable-screen phones) have gradually entered people's vision. It is well known that, to realize the communication function of a mobile terminal, an antenna needs to be installed on it, and the antenna is mainly used for data transmission. Different communication requirements require an antenna to have different data transmission rates. Generally, calls or web browsing have lower requirements for data transmission rates, while some games or videos have higher requirements.

Generally, antennas of foldable-screen mobile terminals often have fixed data transmission rates. As a result, such mobile terminals have lower adaptability to communication requirements for different data transmission rates.

SUMMARY

According to a first aspect, an embodiment of the present disclosure provides a mobile terminal, including a first module and a second module, where the first module and the second module may be in a folded state or an unfolded state.

The first module is provided with a first antenna radiation branch, where the first antenna radiation branch is provided with a first feed point and a first ground point, and the first feed point is electrically connected to a first feed source via a switch; and the second module is provided with a second antenna radiation branch, where the second antenna radiation branch is provided with a second feed point and a second ground point.

In a case where the first module and the second module are in the folded state, the switch is in the off state, and in a case where the first module and the second module are in the unfolded state, the switch is in the on state.

According to a second aspect, an embodiment of the present disclosure further provides an antenna control method, applied to the foregoing mobile terminal, and including:

controlling the switch to be in the off state in the case where the first module and the second module are in the folded state; and controlling the switch to be in the on state in the case where the first module and the second module are in the unfolded state.

According to a third aspect, an embodiment of the present disclosure further provides a mobile terminal, including a processor, a memory, and a computer program that is stored in the memory and executable on the processor, where when the processor executes the computer program, the steps of the foregoing antenna control method are implemented.

According to a fourth aspect, an embodiment of the present disclosure further provides a non-transitory computer-readable storage medium, where the non-transitory computer-readable storage medium stores a computer program, and when the computer program is executed by a processor, the steps of the foregoing antenna control method are implemented.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
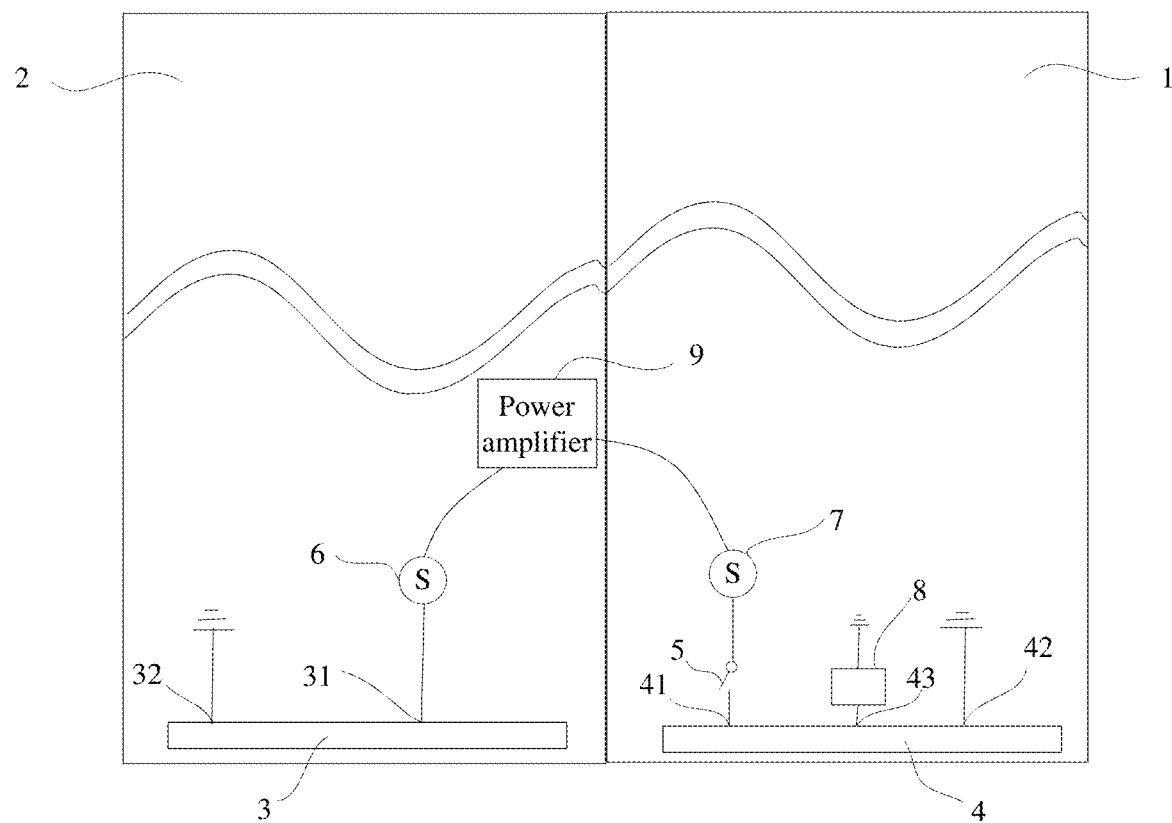
FIG. 1 is a structural diagram of a mobile terminal with a first module and a second module being in an unfolded state according to some embodiments of the present disclosure.
Figure 2:
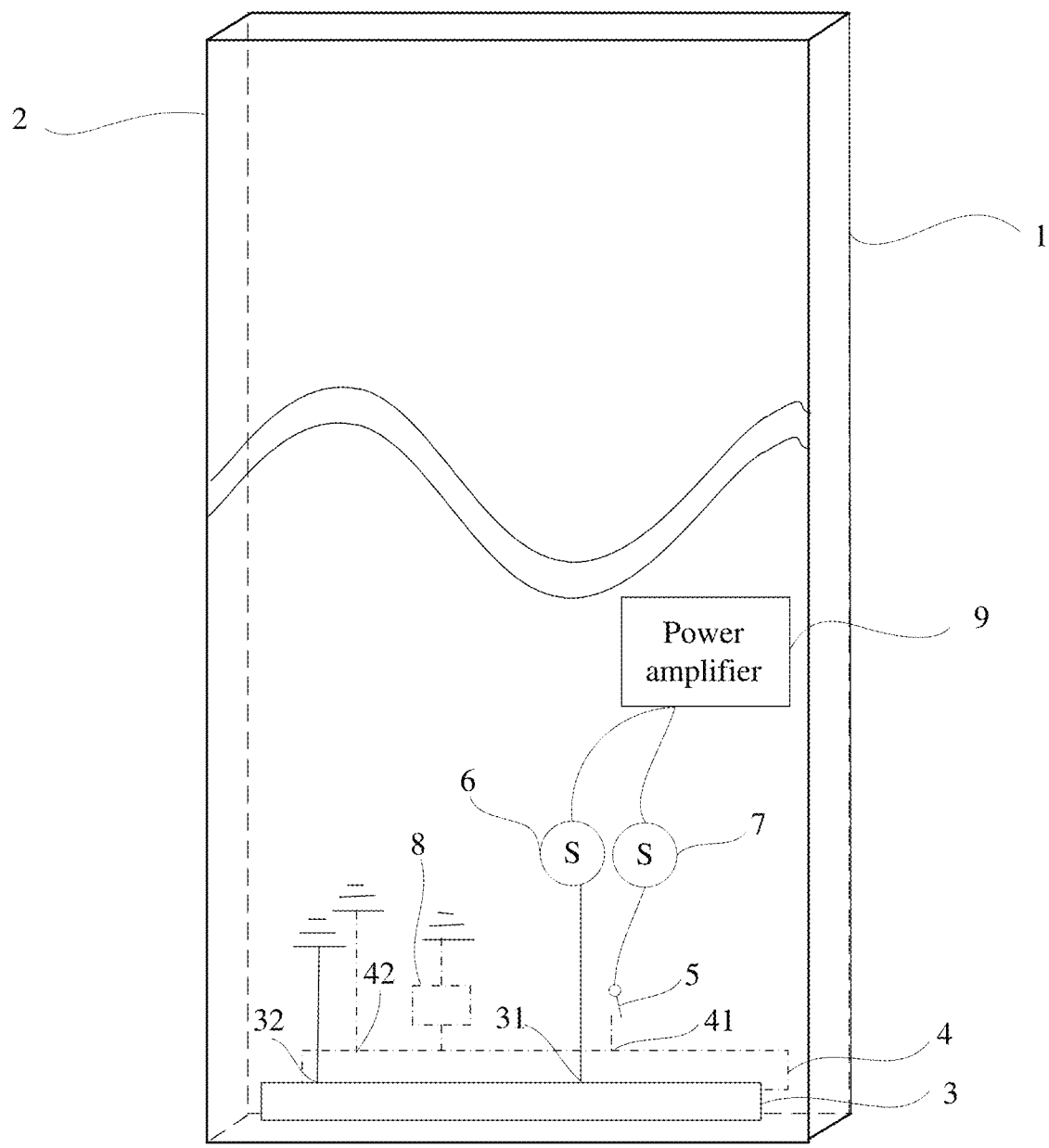
FIG. 2 is a structural diagram of the mobile terminal, shown in FIG. 1, with the first module and the second module being in a folded state.

As shown in FIG. 1 and FIG. 2, some embodiments of the present disclosure provide a mobile terminal, including a first module 1 and a second module 2, where the first module 1 and the second module 2 may be in a folded state or an unfolded state.

The first module 1 is provided with a first antenna radiation branch 4, the first antenna radiation branch 4 is provided with a first feed point 41 and a first ground point 42, and the first feed point 41 is electrically connected to a first feed source 7 via a switch 5. The second module 2 is provided with a second antenna radiation branch 3, and the second antenna radiation branch 3 is provided with a second feed point 31 and a second ground point 32.

In the case where the first module 1 and the second module 2 are in the folded state, the switch 5 is in the off state, and in the case where the first module 1 and the second module 2 are in the unfolded state, the switch 5 is in the on state.

The mobile terminal may be a mobile phone, a tablet personal computer, a laptop computer, a personal digital assistant (PDA), a mobile Internet device (MID), a wearable device, or the like.

The first module 1 may be a shell, a display module, or a combined structure of a shell and a display module; and the second module 2 may be a shell, a display module, or a combined structure of a shell and a display module. The first module 1 and the second module 2 may be connected by a rotating shaft or sliding rail. In the case where the first module 1 and the second module 2 are connected via a rotating shaft, the first module 1 and the second module 2 may get into the folded state or unfolded state by rotating around the rotating shaft. In the case where the first module 1 and the second module 2 are connected by a sliding rail, the first module 1 and the second module 2 may get into the folded state or unfolded state by sliding along the sliding rail. Alternatively, the first module 1 and the second module 2 may get into the folded state or unfolded state in other connection manners, which is not limited in the embodiments of the present disclosure.

The first antenna radiation branch 4 may adopt a flexible printed circuit (FPC), laser directed structuring (LDS), or a breakpoint middle frame. The second antenna radiation branch 3 may adopt an FPC, LDS, or a breakpoint middle frame. The first feed source 7 may be a 3rd-Generation (3G) mobile communication technology, 4th-Generation (4G) mobile communication technology, 5th-Generation (5G) mobile communication technology, wireless fidelity (Wi-Fi), or global positioning system (GPS) radio frequency module which requires multiple antennas.

Figure 4:
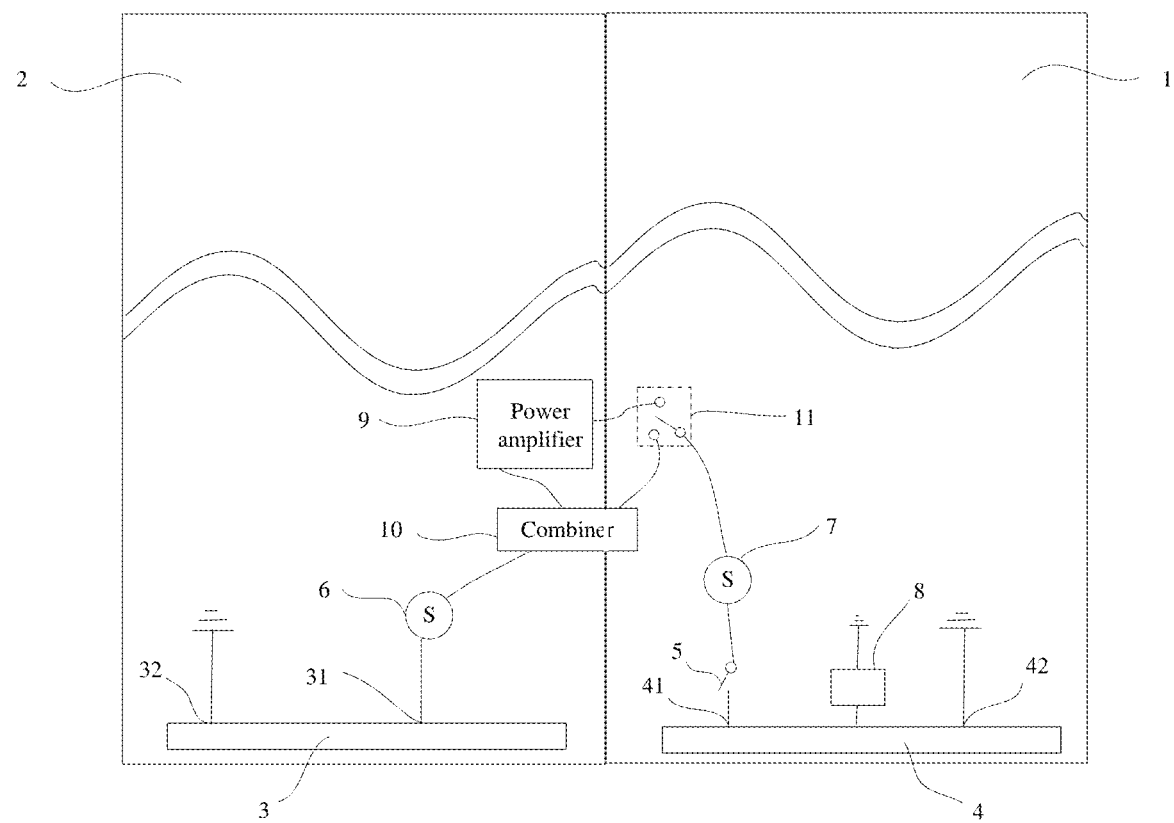
FIG. 4 is another structural diagram of the mobile terminal with the first module and the second module being in the unfolded state according to some embodiments of the present disclosure.

As shown in FIG. 1, FIG. 2, and FIG. 4, the second feed point 31 may be electrically connected to the second feed source 6, where the second feed source 6 may be a 3G, 4G, 5G, Wi-Fi, or GPS radio frequency module which requires multiple antennas. In addition, it should be noted that the second feed point 31 may be electrically connected to the second feed source 6 via a normally-closed switch.

In the embodiments of the present disclosure, in the case where the first module and the second module are in the folded state, the switch is in the off state, that is, the first antenna radiation branch is isolated from the feed source, and only the second antenna radiation branch works normally. In the case where the first module and the second module are in the unfolded state, the switch is in the on state, that is, both the first antenna radiation branch and the second antenna radiation branch can work normally. Therefore, a data transmission rate of an antenna of a foldable-screen mobile terminal can be flexibly adjusted by changing relative status of the first module and the second module, so that the foldable-screen mobile terminal can better adapt to the communication requirements for different data transmission rates.

Optionally, in the case where the first module 1 and the second module 2 are in the folded state, the first antenna radiation branch 4 is in capacitive coupling with the second antenna radiation branch 3.

The first antenna radiation branch 4 and the second antenna radiation branch 3 may be spaced by a specific distance. For example, the distance may be greater than or equal to a preset threshold.

In the case where the first module and the second module are in the folded state, the first antenna radiation branch is in capacitive coupling with the second antenna radiation branch. Therefore, in the case where the first module and the second module are in the folded state, the antenna energy radiated from the second antenna radiation branch can be transferred to the first antenna radiation branch through capacitive coupling for secondary radiation, thereby increasing the radiation capability and bandwidth of the antenna.

Figure 3:
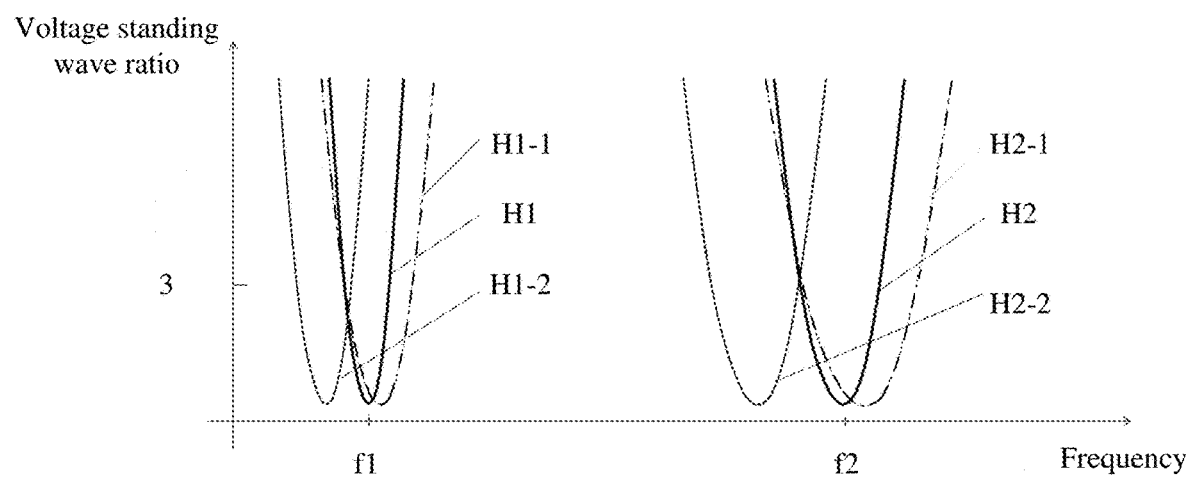
FIG. 3 is an exemplary diagram of the mobile terminal according to some embodiments of the present disclosure.

For a more intuitive understanding of the beneficial effects of this implementation, see FIG. 3. FIG. 3 is a schematic diagram of comparing antenna resonant modes generated by the mobile terminal in the related art and the mobile terminal in this implementation in the case where the first module and the second module are in the folded state. H1 and H2 represent two antenna resonant modes generated by the mobile terminal in the related art in the case where the first module and the second module thereof are in the folded state. H1-1 and H2-1 represent two antenna resonant modes generated by the first antenna radiation branch 4 of the mobile terminal in this implementation in the case where the first module 1 and the second module 2 are in the folded state. H1-2 and H2-2 represent two antenna resonant modes generated by the second antenna radiation branch 3 of the mobile terminal in this implementation through coupling in the case where the first module 1 and the second module 2 are in the folded state.

It is easy to learn from FIG. 3 that the mobile terminal in this implementation generates the two antenna resonant modes H1-1 and H2-1 corresponding to the antenna resonant modes H1 and H2 respectively by the first antenna radiation branch 4, and further generates the two antenna resonant modes H1-2 and H2-2 by the second antenna radiation branch 3 through coupling. Apparently, the total bandwidth of the antenna resonant modes H1-1, H2-1, H1-2, and H2-2 is greater than that of the antenna resonant modes H1 and H2, which indicates that the mobile terminal in this implementation has a wider antenna bandwidth and a higher radiation capability than the mobile terminal in the related art. In addition, as shown in FIG. 3, the bandwidth of the antenna resonant mode H1-1 is wider than that of the antenna resonant mode H1, and the bandwidth of the antenna resonant mode H2-1 is wider than that of the antenna resonant mode H2, which indicates that the second antenna radiation branch 3 can enlarge the radiation space of the first antenna radiation branch 4, thereby further improving the radiation capability of the first antenna radiation branch 4.

Optionally, in the case where the first module 1 and the second module 2 are in the folded state, the first antenna radiation branch 4 is aligned with the second antenna radiation branch 3.

In the case where the first module 1 and the second module 2 are in the folded state, the first antenna radiation branch 4 is aligned with the second antenna radiation branch 3, which can be understood as that the shape and dimension of the first antenna radiation branch 4 are consistent with those of the second antenna radiation branch 3. In addition, in the case where the first module 1 and the second module 2 are in the folded state, the first antenna radiation branch 4 is completely aligned with the second antenna radiation branch 3.

In the case where the first module and the second module are in the folded state, the first antenna radiation branch is aligned with the second antenna radiation branch. This can improve the coupling effect of the first antenna radiation branch and the second antenna radiation branch, and further improve the radiation capability of the antenna and making the mobile terminal look more symmetrical and neater.

Optionally, as shown in FIG. 1, the first antenna radiation branch 4 is further provided with a tuning point 43, and the tuning point 43 is electrically connected to a tuning circuit 8.

The tuning circuit 8 may be grounded and may be used to adjust the resonant frequency of the first antenna radiation branch 4 in the case where the first module 1 and the second module 2 are in the folded state, so that the resonant frequency of the first antenna radiation branch 4 can adapt to that of the second antenna radiation branch 3. For example, the first antenna radiation branch 4 may be used to generate two resonant modes: low-frequency resonance and high-frequency resonance.

As the tuning circuit is provided, the resonant frequency of the first antenna radiation branch can be adjusted as required. In this way, in the case where the first module and the second module are in the folded state, the first antenna radiation branch can be a parasitic antenna radiation branch of the second antenna radiation branch, thereby increasing the radiation capability and/or the bandwidth of the antenna.

Optionally, the tuning circuit 8 is a switching circuit or a high-frequency filtering circuit.

The switching circuit may be in the on state at a high frequency and in the off state at a low frequency. The high-frequency filtering circuit may be equivalent to an open circuit or high-impedance circuit at a low frequency, and equivalent to a short circuit or low-impedance circuit at a high frequency.

Optionally, the second feed point 31 is electrically connected to the second feed source 6. The mobile terminal further includes a combiner 10 and a combination switch 11, where the combiner 10 is electrically connected to the second feed source 6, and the combiner 10 is electrically connected to the first feed source 7 via the combination switch 11.

In the case where the first module 1 and the second module 2 are in the unfolded state, and the specific absorption rate (SAR) of the mobile terminal is less than or equal to a preset threshold, the combination switch 11 is disconnected from the combiner 10.

In the case where the first module 1 and the second module 2 are in the unfolded state, and the SAR of the mobile terminal is greater than the preset threshold, the combination switch 11 is connected to the combiner 10.

The combination switch 11 may be a single-pole single-throw switch or single-pole multi-throw switch. That the combination switch 11 is a single-pole double-throw switch is used as an example. In the case where the combination switch 11 is a single-pole double-throw switch, one fixed end of the combination switch 11 may be electrically connected to a power amplifier 9, the other fixed end may be electrically connected to the combiner 10, the moving end may be electrically connected to the first feed source, and the combiner is also electrically connected to the power amplifier 9.

As the combiner and combination switch are provided, the antenna can be a multiple-input multiple-output (MIMO) antenna in the case where the SAR does not exceed the standard, and can be a non-MIMO antenna in the case where the SAR exceeds the standard. In this way, the first antenna radiation branch and the second antenna radiation branch can disperse antenna hotspots, thereby reducing the SAR without decreasing the antenna performance, and further reducing adverse effects of antenna electromagnetic radiation on users.

Figure 5:
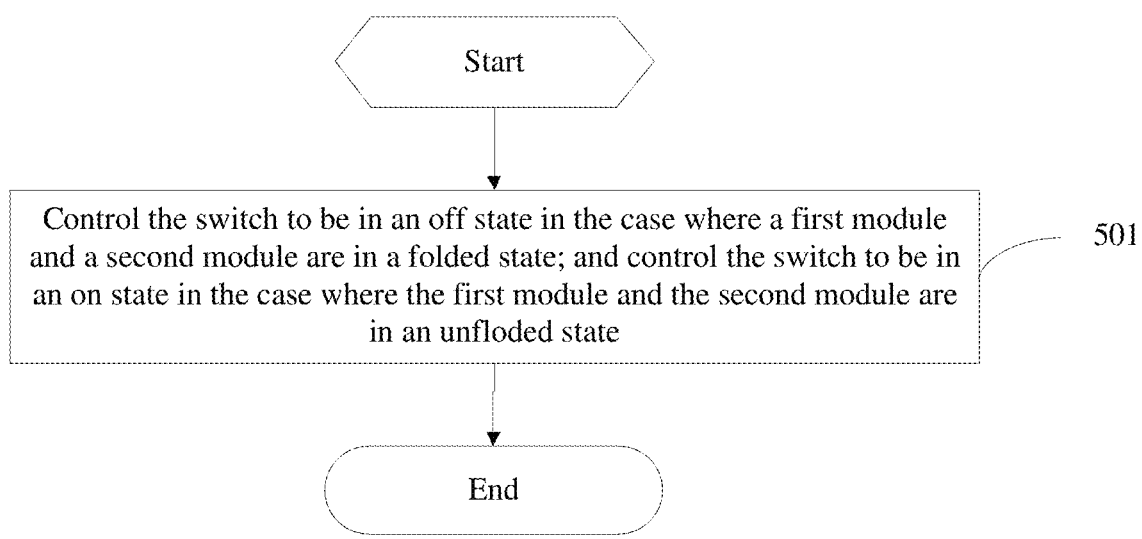
FIG. 5 is a flowchart of an antenna control method according to some embodiments of the present disclosure.

As shown in FIG. 5, some embodiments of the present disclosure further provide an antenna control method, applied to the mobile terminal in any one of the implementations of the foregoing embodiments, and including the following steps.

Step 501: Control the switch to be in the off state in the case where the first module and the second module are in the folded state; and control the switch to be in the on state in the case where the first module and the second module are in the unfolded state.

In the embodiments of the present disclosure, in the case where the first module and the second module are in the folded state, the switch is in the off state, that is, the first antenna radiation branch is isolated from the feed source, and only the second antenna radiation branch works normally; and in the case where the first module and the second module are in the unfolded state, the switch is in the on state, that is, the first antenna radiation branch and the second antenna radiation branch each works independently and normally. Therefore, a data transmission rate of an antenna of a foldable-screen mobile terminal can be flexibly adjusted by changing relative status of the first module and the second module, so that the foldable-screen mobile terminal can better adapt to the communication requirements for different data transmission rates.

Optionally, the antenna control method in the embodiments is applied to the mobile terminal in some of the implementations of the embodiments and includes the following steps.

Control the combination switch to be disconnected from the combiner in the case where the first module and the second module are in the unfolded state, and the SAR of the mobile terminal is less than or equal to a preset threshold.

Control the combination switch to be connected to the combiner in the case where the first module and the second module are in the unfolded state, and the SAR of the mobile terminal is greater than the preset threshold.

In this way, the antenna can be a MIMO antenna in the case where the SAR does not exceed the standard, and can be a non-MIMO antenna in the case where the SAR exceeds the standard. Therefore, the first antenna radiation branch and the second antenna radiation branch can disperse antenna hotspots, thereby reducing the SAR without decreasing the antenna performance, and further reducing adverse effects on users.

Figure 6:
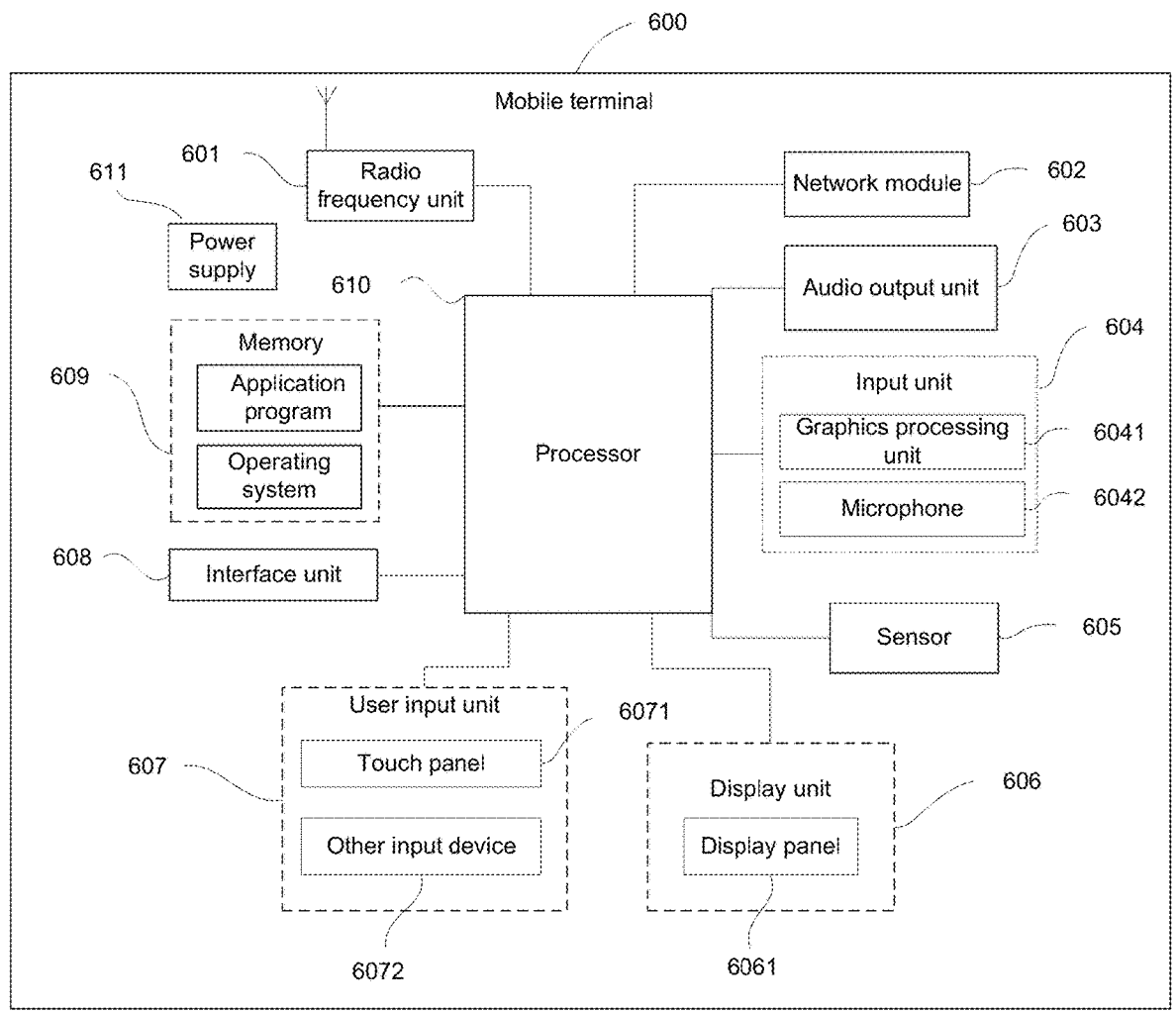
FIG. 6 is a structural diagram of the mobile terminal according to some embodiments of the present disclosure.

FIG. 6 is a schematic diagram of a hardware structure of a mobile terminal implementing embodiments of the present disclosure. The mobile terminal 600 includes, but is not limited to, a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the mobile terminal shown in FIG. 6 constitutes no limitation on the mobile terminal, and the mobile terminal may include more or fewer parts than those shown in the figure, or combine some parts, or have a different part arrangement. In this embodiment of the present disclosure, the mobile terminal includes, but is not limited to, a mobile phone, a tablet computer, a laptop computer, a palmtop computer, an in-vehicle terminal, a wearable device, a pedometer, and the like.

The processor 610 is configured to:
control the switch to be in the off state in the case where the first module and the second module are in the folded state; and
control the switch to be in the on state in the case where the first module and the second module are in the unfolded state.

Optionally, the processor 610 is further configured to:

control the combination switch to be disconnected from the combiner in the case where the first module and the second module are in the unfolded state, and the SAR of the mobile terminal is less than or equal to a preset threshold; and control the combination switch to be connected to the combiner in the case where the first module and the second module are in the unfolded state, and the SAR of the mobile terminal is greater than the preset threshold.

The mobile terminal 600 can implement each process implemented by the mobile terminal in the foregoing embodiments. To avoid repetition, details are not described herein again.

According to the mobile terminal 600 in this embodiment of the present disclosure, in the case where the first module and the second module are in the folded state, the switch is in the off state, that is, the antenna radiation branch that is electrically connected to the switch is isolated from the feed source, and only one antenna radiation branch works normally. In the case where the first module and the second module are in the unfolded state, the switch is in the on state, that is, the first antenna radiation branch and the second antenna radiation branch each works independently and normally. Therefore, a data transmission rate of an antenna of a foldable-screen mobile terminal can be flexibly adjusted by changing relative status of the first module and the second module, so that the foldable-screen mobile terminal can better adapt to the communication requirements for different data transmission rates.

It should be understood that, in this embodiment of the present disclosure, the radio frequency unit 601 may be configured to receive and send information or a signal in a call process. For example, after receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The mobile terminal provides wireless broadband Internet access for a user by using the network module 602, for example, helping the user send and receive an email, browse a web page, and access streaming media.

The audio output unit 603 can convert audio data received by the radio frequency unit 601 or the network module 602 or stored in the memory 609 into an audio signal, and output the audio signal into sound. Moreover, the audio output unit 603 may further provide audio output (for example, call signal receiving sound and message receiving sound) related to a specific function executed by the mobile terminal 600. The audio output unit 603 includes a loudspeaker, a buzzer, a receiver, and the like.

The input unit 604 is configured to receive audio or radio frequency signals. The input unit 604 may include a graphics processing unit (GPU) 6041 and a microphone 6042. The graphics processing unit 6041 is configured to process image data of a static picture or a video obtained by an image capture apparatus (for example, a camera) in video capture mode or image capture mode. A processed image frame can be displayed on the display unit 606. An image frame processed by the graphics processing unit 6041 may be stored in the memory 609 (or another storage medium) or sent by the radio frequency unit 601 or the network module 602. The microphone 6042 may receive sound and can process such sound into audio data. The processed audio data may be converted, in a call mode, into a format that can be sent by using the radio frequency unit 601 to a mobile communication base station, for outputting.

The mobile terminal 600 further includes at least one sensor 605 such as an optical sensor, a motion sensor, or another sensor. For example, the optical sensor includes an ambient light sensor and a proximity sensor. The ambient light sensor may adjust luminance of the display panel 6061 according to brightness of ambient light. The proximity sensor may turn off the display panel 6061 and/or backlight when the mobile terminal 600 is moved to an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a related game, or magnetometer posture calibration), a function related to vibration recognition (for example, a pedometer or a strike), or the like. The sensor 605 may further include a fingerprint sensor, a pressure sensor, an iris sensor, a molecular sensor, a gyroscope, a barometer, a hygrometer, a thermometer, an infrared sensor, and the like. This is not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 may be configured to receive inputted digit or character information and generate key signal input related to user setting and function control of the mobile terminal. For example, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 may be implemented by using a plurality of types such as a resistive type, a capacitive type, an infrared ray, and a surface acoustic wave. In addition to the touch panel 6071, the user input unit 607 may further include the other input devices 6072. For example, the another input device 6072 may include, but not limited to, a physical keyboard, a function key (for example, a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides corresponding visual output on the display panel 6061 based on the type of the touch event. In FIG. 6, although the touch panel 6071 and the display panel 6061 are used as two independent parts to implement input and output functions of the mobile terminal, in some embodiments, the touch panel 6071 and the display panel 6061 may be integrated to implement the input and output functions of the mobile terminal. Details are not described herein.

The interface unit 608 is an interface connecting an external apparatus to the mobile terminal 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 may be configured to receive input (such as data information and power) from the external apparatus and transmit the received input to one or more elements in the mobile terminal 600, or may be configured to transmit data between the mobile terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the mobile terminal, and is connected to all parts of the entire mobile terminal by using various interfaces and lines, and performs various functions of the mobile terminal and processes data by running or executing the software program and/or the module that are/is stored in the memory 609 and invoking the data stored in the memory 609, to implement overall monitoring on the mobile terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the foregoing modem processor may not be integrated into the processor 610.

The mobile terminal 600 may further include a power supply 611 (such as a battery) that supplies power to each component. Optionally, the power supply 611 may be logically connected to the processor 610 by using a power supply management system, to implement functions such as charging, discharging, and power consumption management by using the power supply management system.

In addition, the mobile terminal 600 includes some function modules not shown, and details are not described herein.

Optionally, an embodiment of the present disclosure further provides a mobile terminal, including a processor 610, a memory 609, and a computer program that is stored in the memory 609 and executable on the processor 610. When executing the computer program, the processor 610 implements the foregoing processes of the antenna control method embodiment and a same technical effect can be achieved. To avoid repetition, details are not described herein again.

An embodiment of the present disclosure further provides a non-transitory computer readable storage medium. The non-transitory computer readable storage medium stores a computer program, the computer program, when executed by a processor, implements the processes of the foregoing embodiments of the antenna control method, and same technical effects can be achieved. To avoid repetition, details are not described herein again. The non-transitory computer-readable storage medium includes a read-only memory (ROM), a random access memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements, but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing user equipment (which may be a mobile phone, a computer, a server, an air conditioner, or a network device) to execute the methods described in the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of this disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For hardware implementation, a processing unit can be implemented in one or more application-specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, other electronic units used to perform the functions described in this disclosure, or a combination thereof.

For software implementation, the technology in the embodiments of the present disclosure may be implemented through modules (for example, procedures or functions) that perform the functions in the embodiments of the present disclosure. Software codes can be stored in the memory and executed by the processor. The memory may be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A mobile terminal, comprising a first module and a second module, wherein the first module and the second module are in a folded state or an unfolded state;
   the first module is provided with a first antenna radiation branch, wherein the first antenna radiation branch is provided with a first feed point and a first ground point, and the first feed point is electrically connected to a first feed source via a switch; and the second module is provided with a second antenna radiation branch, wherein the second antenna radiation branch is provided with a second feed point and a second ground point; and
   in a case where the first module and the second module are in the folded state, the switch is in the off state, and in a case where the first module and the second module are in the unfolded state, the switch is in the on state.

2. The mobile terminal according to claim 1, wherein in the case where the first module and the second module are in the folded state, the first antenna radiation branch is in capacitive coupling with the second antenna radiation branch.

3. The mobile terminal according to claim 2, wherein in the case where the first module and the second module are in the folded state, the first antenna radiation branch is aligned with the second antenna radiation branch.

4. The mobile terminal according to claim 2, wherein the first antenna radiation branch is further provided with a tuning point, and the tuning point is electrically connected to a tuning circuit.

5. The mobile terminal according to claim 4, wherein the tuning circuit is a switching circuit or a high-frequency filtering circuit.

6. The mobile terminal according to claim 1, wherein the second feed point is electrically connected to a second feed source; and the mobile terminal further comprises a combiner and a combination switch, wherein the combiner is electrically connected to the second feed source, and the combiner is electrically connected to the first feed source via the combination switch;
   in the case where the first module and the second module are in the unfolded state, and specific absorption rate (SAR) of the mobile terminal is less than or equal to a preset threshold, the combination switch is disconnected from the combiner; and
   in the case where the first module and the second module are in the unfolded state, and the SAR of the mobile terminal is greater than the preset threshold, the combination switch is connected to the combiner.

7. An antenna control method, applied to a mobile terminal, wherein the mobile terminal comprises a first module and a second module, and the first module and the second module are in a folded state or an unfolded state; the first module is provided with a first antenna radiation branch, the first antenna radiation branch is provided with a first feed point and a first ground point, and the first feed point is electrically connected to a first feed source via a switch; the second module is provided with a second antenna radiation branch, the second antenna radiation branch is provided with a second feed point and a second ground point; and
   the method comprises:
   controlling the switch to be in the off state in a case where the first module and the second module are in the folded state; and controlling the switch to be in the on state in a case where the first module and the second module are in the unfolded state.

8. The method according to claim 7, wherein the second feed point is electrically connected to a second feed source; the mobile terminal further comprises a combiner and a combination switch, the combiner is electrically connected to the second feed source, and the combiner is electrically connected to the first feed source via the combination switch; and the method further comprises:

controlling the combination switch to be disconnected from the combiner in the case where the first module and the second module are in the unfolded state, and specific absorption rate (SAR) of the mobile terminal is less than or equal to a preset threshold; and controlling the combination switch to be connected to the combiner in the case where the first module and the second module are in the unfolded state, and the SAR of the mobile terminal is greater than the preset threshold.

9. A non-transitory computer-readable storage medium, wherein the non-transitory computer-readable storage medium stores a computer program, and when a processor executes the computer program, the steps of the antenna control method according to claim 7 are implemented.

10. A mobile terminal, comprising a processor, a memory, and a computer program that is stored in the memory and executable on the processor, wherein the mobile terminal comprises a first module and a second module, and the first module and the second module are in a folded state or an unfolded state; the first module is provided with a first antenna radiation branch, the first antenna radiation branch is provided with a first feed point and a first ground point, and the first feed point is electrically connected to a first feed source via a switch; the second module is provided with a second antenna radiation branch, the second antenna radiation branch is provided with a second feed point and a second ground point; and the computer program, when executed on the processor, causes the processor to perform:

controlling the switch to be in the off state in a case where the first module and the second module are in the folded state; and controlling the switch to be in the on state in a case where the first module and the second module are in the unfolded state.

11. The mobile terminal according to claim 10, wherein the second feed point is electrically connected to a second feed source; the mobile terminal further comprises a combiner and a combination switch, the combiner is electrically connected to the second feed source, and the combiner is electrically connected to the first feed source via the combination switch; and the computer program, when executed on the processor, causes the processor to further perform:

controlling the combination switch to be disconnected from the combiner in the case where the first module and the second module are in the unfolded state, and specific absorption rate (SAR) of the mobile terminal is less than or equal to a preset threshold; and controlling the combination switch to be connected to the combiner in the case where the first module and the second module are in the unfolded state, and the SAR of the mobile terminal is greater than the preset threshold.

* * * * *